United States Patent [19]

Andersen

[11] Patent Number: 4,997,557
[45] Date of Patent: Mar. 5, 1991

[54] FLOATING, MIXING, AERATING AND DECANTING UNIT

[75] Inventor: Gary L. Andersen, Rockford, Ill.

[73] Assignee: Aqua-Aerobic Systems, Inc., Rockford, Ill.

[21] Appl. No.: 354,135

[22] Filed: May 19, 1989

[51] Int. Cl.$^5$ .............................. B01D 21/30
[52] U.S. Cl. .................. 210/142; 210/242.2; 210/242.3; 210/260
[58] Field of Search ............... 210/242.1, 242.2, 242.3, 210/919, 920, 142, 122, 525, 151, 532.1, 260; 366/251, 263, 270, 136; 261/87, 93

[56] References Cited

U.S. PATENT DOCUMENTS

| | | | |
|---|---|---|---|
| 3,483,983 | 12/1969 | Lindstrom | 210/242.1 |
| 3,606,273 | 9/1971 | Johnson | 366/263 |
| 3,722,689 | 3/1973 | Markel et al. | 210/923 |
| 3,802,673 | 4/1974 | Ross | 210/242.2 |
| 3,833,122 | 9/1974 | Cook | 210/242.1 |
| 3,846,517 | 11/1974 | Ross | 210/242.2 |
| 3,884,807 | 5/1975 | Heddon | 210/242.2 |
| 3,923,649 | 12/1975 | Sparham et al. | 210/242.1 |
| 4,089,620 | 5/1978 | Ravitts | 366/270 |
| 4,303,520 | 12/1981 | Wirt | 210/242.1 |
| 4,324,656 | 4/1982 | Godar | 210/242.2 |
| 4,422,771 | 12/1983 | Earhart et al. | 366/136 |
| 4,422,929 | 12/1983 | Owens | 210/242.1 |
| 4,485,013 | 11/1984 | Cockman | 210/242.2 |
| 4,614,582 | 9/1986 | Campitelli | 210/242.3 |
| 4,681,711 | 7/1987 | Eaton | 210/242.2 |
| 4,690,756 | 9/1987 | Van Ry | 210/242.2 |
| 4,695,376 | 9/1987 | Astrom et al. | 210/242.1 |
| 4,723,848 | 2/1988 | Knight | 366/270 |
| 4,733,972 | 3/1988 | Weis | 366/251 |
| 4,734,235 | 3/1988 | Holyoak | 210/242.2 |

Primary Examiner—Richard V. Fisher
Assistant Examiner—Cynthia L. Nessler
Attorney, Agent, or Firm—Vernon J. Pillote

[57] ABSTRACT

A mixing, aerating and decanting unit adapted for floating installation in a liquid treatment basin and operable to provide mixing, aeration, settling and decanting phases in an SBR (sequencing bath reactor) process. The unit comprises a rigid support structure with floats for buoyantly supporting the unit in the basin, a mixing apparatus operable to mix liquid in the basin, an aerating apparatus selectively operable to supply air to the water in the basin, and a decanter apparatus for decanting liquid from the basin.

11 Claims, 3 Drawing Sheets

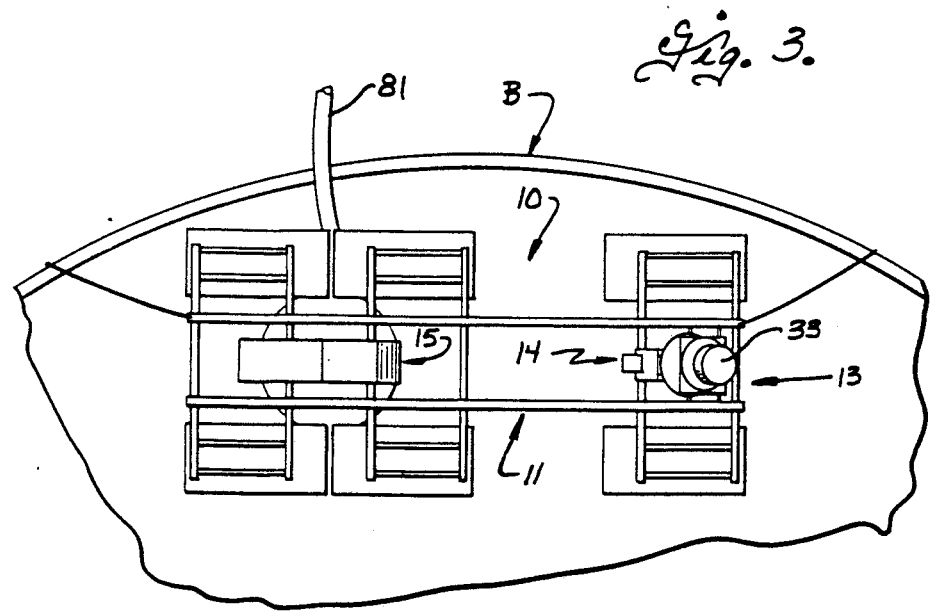
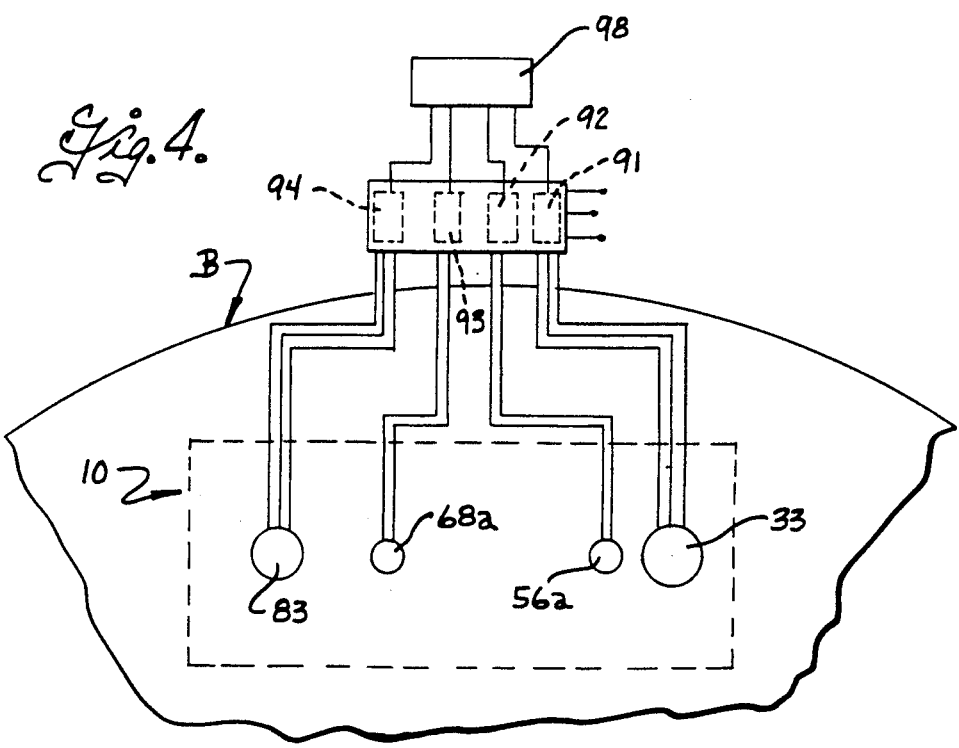

FLOATING, MIXING, AERATING AND DECANTING UNIT

BACKGROUND OF THE INVENTION

In the sequencing batch reactor process of waste water treatment, a basin or reactor is operated in a batch treatment mode involving a fill phase, a react phase, a settle phase, and a decant phase. Depending upon the treatment requirement of the specific SBR design, the fill cycle may be composed of static-fill, mix-only-fill, as well as react-fill phases. Under static fill, influent flow is introduced to the reactor under a non-mixed, non-aerated environment. A mix-fill phase provides reactor mixing without aeration, and react-fill and the react phases involve both mixing and aeration. The suspended solids are allowed to settle during the settle phase, and the relatively clear effluent is withdrawn from the reactor during the decant phase. The duration and timing of the several phases varies in different installations and some of the phases can overlap.

Sequencing batch reactor systems, hereinafter referred to as SBR systems, have heretofore employed a plurality of separate apparatus which are individually installed in the reactor basin. For example, some prior SBR systems made by the assignee of the present invention used a floating downflow mixer of the type disclosed in U.S. Pat. No. 4,422,771; aerator means either of the floating spray type disclosed in U.S. Pat. No. 3,606,273 or the submerged air diffuser type; and a floating decanter of the type disclosed in U.S. Pat. No. 4,695,376. The mixer, aerator and decanter were individually installed in the reactor basin and operated under an SBR program controller which would operate the mixer, aerator and decanter during the appropriate phases of the SBR process. It has also been proposed, for example as disclosed in U.K. Patent 1,428,349 published Mar. 17, 1976, to provide a down-flow mixer with an aspirator nozzle to aspirate air into the liquid pump of the downflow mixer.

SUMMARY OF THE INVENTION

It is an object of the present invention to simplify and expedite installation of an SBR system.

Accordingly, the present invention provides a mixing, aerating and decanter unit that is adapted for floating installation as a unit in a liquid treatment basin and which is operable to provide mixing, aeration, settling and decanting phases in an SBR process. The unit comprises a rigid support structure and float means attached to the support structure for buoyantly supporting the unit in the basin; a mixing apparatus mounted on the support structure for support thereby and including pump means having discharge outlet means below the liquid level for circulating and mixing liquid in the basin, and pump drive motor means operable to drive the pump means, aeration means mounted on the support structure for support thereby and including air outlet means disposed below the liquid level for supplying air to the liquid in the basin, and selectively operable air control means for shutting off a supply of air, and decanter means mounted on the support structure for support thereby and including decanter inlet means disposed below the liquid level for decanting liquid from the basin. Selectably operable decant control means are provided on the support structure for closing the decanter inlet.

The mixing, aerating and decanting unit can be installed as a unit, for example by a crane, into a water treatment basin. The unit can be anchored by flexible cables at the desired location in the basin and electrically connected to an SBR process controller either adjacent to or remote from the basin. Mounting the mixing, aerating and decanting apparatus on a single buoyantly supported unit, not only facilitates and expedites installation of the SBR apparatus, but also provides a more stable buoyant support for the several apparatus.

BRIEF DESCRIPTION OF THE DRAWINGS

FIG. 3 is a plan view of the unit shown installed in a water treatment basin; and FIG. 4 is a diagrammatic view illustrating connection of the mixing, aerating and decanting unit to an SBR program controller.

DETAILED DESCRIPTION OF THE PREFERRED EMBODIMENT

Figure 1:
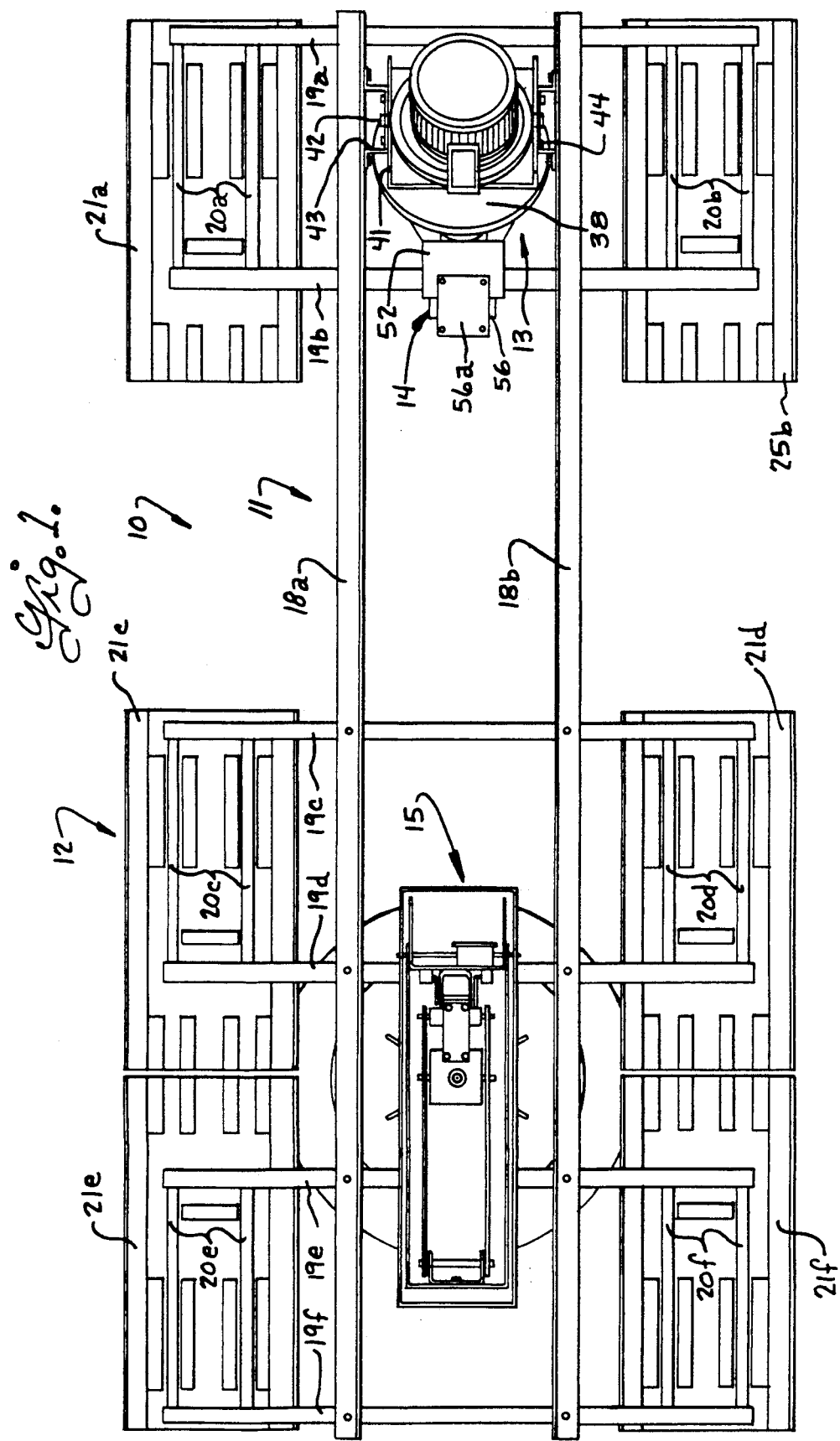
FIG. 1 is a plan view of a mixing, aerating and decanting unit embodying the present invention.
Figure 2:
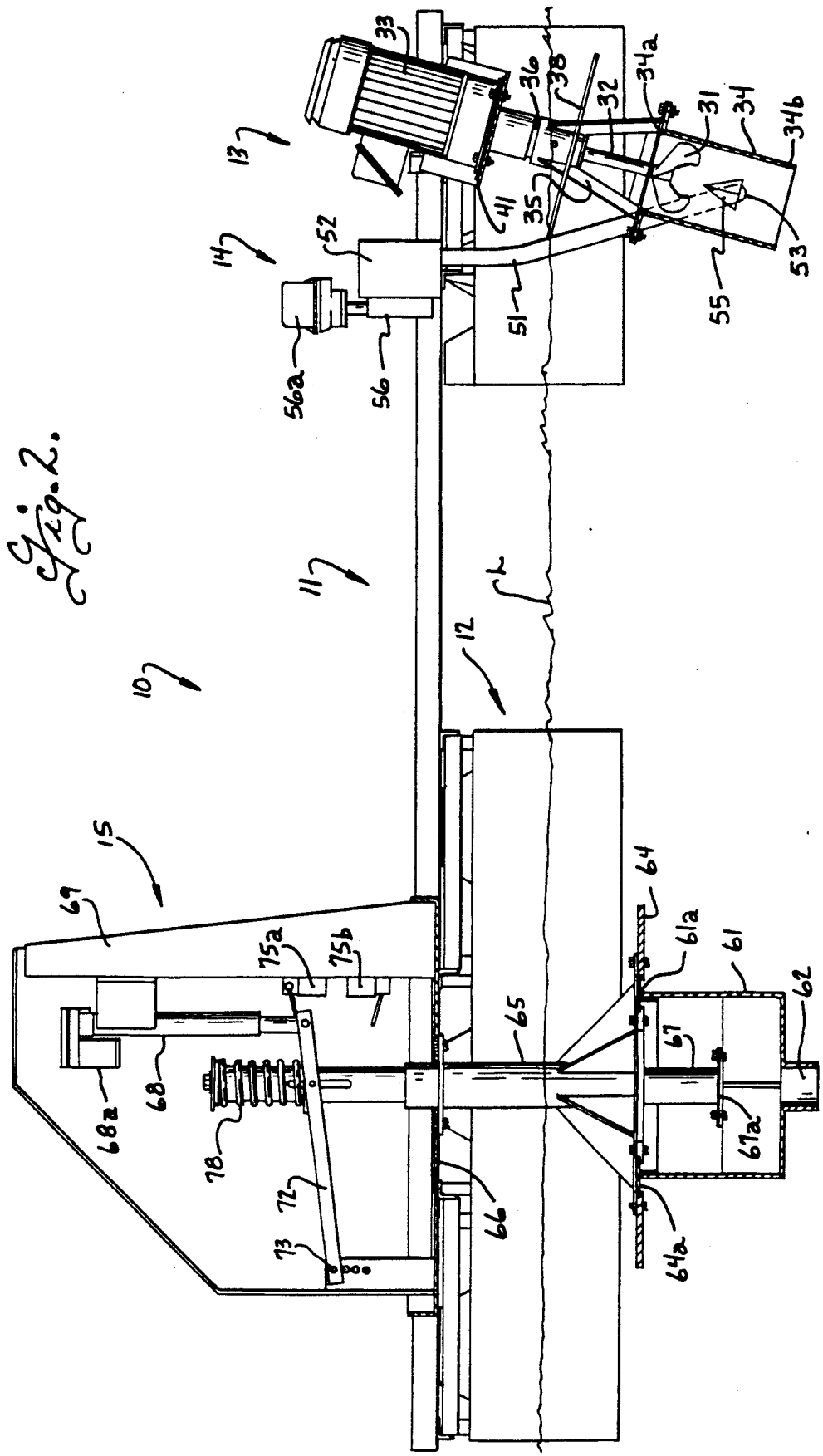
FIG. 2 is a longitudinal vertical sectional view through the mixing, aerating and decanting unit.

Referring now more specifically to FIGS. 1-3, there is illustrated a mixing, aerating and decanting unit 10 that is adapted for floating installation as a unit in a liquid treatment basin designated generally by the letter B, and which is operable to provide mixing, aeration, settling and decanting phases in an SBR process. The unit includes a rigid support structure 11, float means 12 for buoyantly supporting the unit in a basin, a mixing apparatus 13 mounted on the support structure for mixing liquid and suspendible solids in the basin, an aerating apparatus 14 mounted on the support structure for supplying air to the liquid in the basin, and a decanting apparatus 15 mounted on the support structure for decanting liquid from the basin.

As best shown in FIGS. 1 and 3, the support structure includes longitudinally extending frame members 18a and 18b and a plurality of cross frame members 19a-19f at spaced locations along the longitudinal frame members. Floats 21a-21f are mounted on frame members 20a-20f respectively that form a part of the rigid support structure. The mixing apparatus 13 and aerating apparatus 14 are mounted between the longitudinal frame members 18a and 18b adjacent one end of the unit and the decanter apparatus 15 is mounted between the frame members 18a and 18b adjacent the other end of the unit. Float members 21a and 21b are located outside the longitudinal frame members at relatively opposite sides of the mixing and aerating apparatus, and float members 21c, 21e and 21d, 21f are located outwardly of the longitudinal frame members at relatively opposite sides of the decanter apparatus, to buoyantly support the unit in a water treatment basin, with the rigid support structure spaced above the liquid level L (FIG. 2) in the basin as shown in FIG. 2.

The mixing apparatus 13 includes a liquid pump means having a discharge outlet below the water level for circulating and mixing liquid and suspendible solids in the basin. The mixer is preferably of the propeller type having a propeller 31 disposed below the liquid level and connected through a drive shaft 32 to a drive motor 33. A pump casing 34 surrounds the propeller 31 and has an inlet end 34a and outlet end 34b, and the pump casing is supported concentric with the propeller and shaft by struts 35 fixed to a shaft stabilizer tube 36. An anti-cavitation cavitation plate 38 is preferably provided on the shaft stabilizer tube 36 at a location spaced above the casing inlet 34a and below the water level, to inhibit forming a vortex when the propeller pump is operated. The propeller, when driven by the motor 33, pumps liquid downwardly through the pump casing 34 and, in order to adapt the apparatus for use in basins of different size and depth, the mixer apparatus is advantageously mounted for limited angular adjustment so that the mixer produces a stream having a horizontal component to aid in circulating liquid in the basin. As shown in FIGS. 1 and 2, the mixer motor is supported on a generally U-shaped base 41 that is pivotally supported by pins 42 on brackets 43 secured to the longitudinal frame members 18a and 18b, for adjustment about a horizontal axis crosswise of the length of the frame members 18a and 18b. A means such as bolts 44 are provided for securing the mixer in a selected adjusted position.

The aerating means 14 has air outlet means disposed below the liquid level for supplying air to the liquid in the basin. The aeration means is preferably arranged to supply air at a location adjacent the propeller 31 for circulation with the liquid pump by the mixer. In the preferred embodiment illustrated, the aeration means includes one or more air passages or tubes 51 (FIG. 2) having an air inlet means 52 mounted above the liquid level and open to atmosphere, and air outlet means 53 below the liquid and adjacent the propeller means and constructed and arranged to aspirate air into the liquid pump by the propeller means for circulation therewith. As best shown in FIG. 2, the lower ends 53 of the tubes 51 open in the side of the pump casing 34 below the propeller 31, and aspirator nozzles 55 are fixed to the inner side of the pump casing and have downwardly diverging walls that are open at the lower end to deflect liquid pumped by the propeller away from the air outlet openings 53 and produce a low pressure zone for aspirating air into the water pumped by the mixer through the pump casing. The air inlet means 52 includes an air control valve means 56 that is movable between a closed position blocking flow of atmospheric air into the upper ends of the tubes 51 and an open position to allow atmospheric air to flow into the tubes. An electro-responsive operator 56a is provided for operating the air control valve means between its open and closed positions.

The decanter means 15 is supported on the support structure with the decanter inlet below the liquid level to decant liquid from the basin. The decanter is preferably of the type generally disclosed in U.S. Pat. No. 4,695,376 assigned to the assignee of the present invention, the disclosure of which is incorporated herein by reference. In general, the decanter includes a decanter receptacle 61, preferably of circular configuration, and which is open at its upper end 61a and which has a decanter outlet 62 at its lower end. A decanter cover 64 is provided for closing the open upper end of the decanter and the decanter cover and decanter are mounted for relative movement into and out of a closed position. As best shown in FIG. 2, the decanter cover 64 is mounted on a tube 65 supported by a mounting plate 66 attached to the longitudinal frame members 18a and 18b. An actuator tube 67 has its lower end fixed as by brackets 67a to the decanter 61 and the actuator tube extends upwardly through the tube 65. A decanter control 68 including an electro-responsive decanter operator 68a is mounted as by a bracket 69 on the support structure and the decanter control 68 is arranged to raise and lower the actuator tube 67 through a lever 72 pivoted at 73 on the support structure. As disclosed more fully in the aforementioned U.S. Pat. No. 4,695,376, limit switches 75a and 75b are arranged to be actuated when the actuator reaches preselected upper and lower positions and a spring 78 is interposed between the lever and the upper end of the actuator tube and is arranged to be compressed when the lever 72 is raised, to yieldably bias the decanter receptacle 61 to a closed position engaging the cover 64. The cover 64 includes a resilient ring portion 64a arranged to sealingly engage the upper edge 61a of the decanter receptacle 61, when the decanter receptacle is in its raised position, and the cover extends outwardly from the periphery of the decanter receptacle to inhibit drawing of water from adjacent the surface of the liquid in the basin during decanting.

The decanter outlet 62 is connected to a flexible decant line 81 (FIG. 3). In some installations the decant line 81 can be arranged to decant liquid by syphon action when the decanter inlet is open. In some other installations, a decanter pump (not shown) driven by a decanter motor 83 (FIG. 4) can be provided for pumping the decant liquid from the decanter receptacle.

As diagrammatically illustrated in FIG. 4, the mixer drive motor 33 is selectively operable under the control of a motor start relay 91 and the electro-responsive operator 56a for the air control 52 is selectively operable under the control of a relay means 92. The electro-responsive operator 68a for the decanter control is selectively operated under the control of a relay means 93, and a motor control relay 94 can be provided for operating the decanter pump motor, if a decanter motor is used. An adjustable programmer 98 is provided for controlling the relays 91-94 and the mixer motor, air control 56, decanter control 68 and decanter pump motor 83. The electrical controls and programmer can be located remote from the mixing, aerating and decanter unit and electrically connected thereto through suitable flexible cables.

From the foregoing it will be seen that the mixing, aerating and decanter unit can be readily installed as a unit in a water treatment basin and then tethered or anchored at the desired location in the basin by suitable cables or the like. The SBR programmer and controller are preferably mounted at a fixed location on the shore, but can be readily connected to the mixing, aerating and decanter unit through flexible cables. The floatable unit not only simplifies and expedites the installation in a basin to provide the mixing, aerating, settle and decant phases of an SBR process, but also provides a more stable floating support than is achieved with separate floating units.

The embodiments of the invention in which an exclusive property or privilege is claimed are defined as follows:

1. A mixing, aerating and decanting apparatus adapted for floating installation as a unit in a waste liquid treatment basin, and operable to provide mixing, aeration, settling and decanting phases in an SBR (sequencing batch reactor) process, the apparatus comprising:

(a) a rigid support structure;
(b) float means attached to the support structure for buoyantly supporting the unit in a basin;

(c) a mixing apparatus mounted on the support structure for support thereby and including pump means having discharge outlet means below the liquid level for circulating and mixing waste liquid in the basin, and pump drive motor means operable to drive the pump means;

(d) aerator means mounted on the support structure for support thereby including air outlet means disposed below the liquid level for supplying air to the waste liquid in the basin, and selectively operable air control means for shutting off the supply of air;

(e) decanter means mounted on the support structure for support thereby and including decanter inlet means disposed below the liquid level for decanting liquid from the basin, and selectively operable decant control means on the support structure for closing the decanter inlet means; and (f) SBR process cycle control means for controlling operation of the drive motor means and the air control means and the decant control means through an SBR process cycle in the basin.

2. A mixing, aerating and decanting unit according to claim 1, wherein the pump means includes a propeller for pumping liquid in the basin, and the air outlet means of the aerator means is disposed adjacent the propeller.

3. A mixing, aerating and decanting unit according to claim 1 wherein the pump means includes a propeller means for pumping waste liquid in the basin and the aerator means comprises air passage means having atmospheric air inlet means above the liquid level, the air outlet means being disposed adjacent the propeller means and constructed and arranged to aspirate air into the liquid pumped by the propeller means.

4. A mixing, aerating and decanting unit according to claim 3 wherein the selectively operable air control means includes valve means operable to shut off air flow through said air passage means, and electro-responsive means for operating said valve means.

5. A mixing, aerating and decanting unit according to claim 1 wherein the decant control means includes a decant receiver means having an open top, decant cover means, means for relatively moving said decant receiver means and said decant cover means into and out of position closing the open top of the decant receiver means, and electro-responsive means on said support structure for operating said means for relatively moving the decant receiver means and said cover means.

6. A mixing, aerating and decanting apparatus adapted for floating installation as a unit in a liquid treatment basin and operable to provide mixing, aeration, settling and decanting phases in an SBR (sequencing batch reactor apparatus) process, the apparatus comprising:

(a) a rigid support structure;

(b) float means attached to the support structure for buoyantly supporting the unit in the basin;

(c) mixing apparatus including drive motor means mounted on the support structure for support thereby above the liquid level, shaft means drivingly connected to the drive motor means and extending downwardly therefrom, and propeller means on the shaft means for pumping liquid in the basin when the drive motor means is operated;

(d) aerator means mounted on the support structure and including air passage means having air inlet means above the liquid level open to atmosphere and air outlet means below the liquid level adjacent the propeller means and constructed and arranged to aspirate air into the liquid pumped by the propeller means for dispersion therewith, air control means operable to shut off flow of air through the air passage means;

(e) decanter means mounted on the frame structure and including decanter inlet means disposed below the liquid level for decanting liquid from the basin;

(f) selectively operable decant control means on the support structure for closing the decanter inlet means; and (g) SBR process cycle control means for controlling operation of the drive motor means and the air control means and the decant control means through an SBR process cycle in the basin.

7. A mixing, aerating and decanting unit according to claim 6 wherein the decant control means includes electro-responsive operating means.

8. A mixing, aerating and decanting unit according to claim 7 wherein the air control means includes electro-responsive operating means.

9. A mixing, aerating and decanter unit according to claim 6 wherein the drive shaft means is inclined to the vertical.

10. A mixing, aerating and decanting unit according to claim 6 wherein said support structure has a major lengthwise dimension and a relatively smaller crosswise dimension, said mixing apparatus and said decanter means being spaced apart along the major lengthwise direction of the support structure, said drive shaft means being inclined to the vertical in a plane generally paralleling the major lengthwise dimension of the support structure.

11. A mixing, aerating and decanting unit according to claim 10 wherein the drive shaft means is inclined downwardly towards the decanter means.

* * * * *

UNITED STATES PATENT AND TRADEMARK OFFICE
CERTIFICATE OF CORRECTION

PATENT NO. : 4,997,557

DATED : March 5, 1991

INVENTOR(S) : Gary L. Andersen

It is certified that error appears in the above-identified patent and that said Letters Patent is hereby corrected as shown below:

Column 6, line 1, delete "apparatus" (first occurrence).

Signed and Sealed this

Seventh Day of July, 1992

Attest:

DOUGLAS B. COMER

*Attesting Officer*    Acting Commissioner of Patents and Trademarks